United States Patent
Klein

(10) Patent No.: US 6,182,232 B1
(45) Date of Patent: Jan. 30, 2001

(54) POWER AND THERMAL MANAGEMENT BASED ON A POWER SUPPLY OUTPUT

(75) Inventor: Dean A. Klein, Eagle, ID (US)

(73) Assignee: Micron Electronics, Inc., Nampa, ID (US)

(*) Notice: Under 35 U.S.C. 154(b), the term of this patent shall be extended for 0 days.

(21) Appl. No.: 09/239,635

(22) Filed: Jan. 29, 1999

(51) Int. Cl.[7] .................................................. G06F 1/26
(52) U.S. Cl. ........................ 713/340; 713/300; 713/320; 713/322; 713/323
(58) Field of Search .................................. 713/300, 322, 713/320, 323, 324, 340

(56) References Cited

U.S. PATENT DOCUMENTS

| | | | |
|---|---|---|---|
| 5,532,935 | * 7/1996 | Ninomiya et al. | 364/492 |
| 5,570,286 | * 10/1996 | Margolis et al. | 701/36 |
| 5,606,704 | 2/1997 | Pierce et al. | |
| 5,664,202 | 9/1997 | Chen et al. | |
| 5,754,870 | 5/1998 | Pollard et al. | |
| 5,832,286 | 11/1998 | Yoshida | |
| 5,848,282 | * 12/1998 | Kang | 713/323 |
| 5,883,523 | * 3/1999 | Ferland et al. | 324/765 |
| 5,954,820 | 9/1999 | Hetzler | |
| 5,955,945 | * 9/1999 | Fuhrer | 340/479 |
| 5,996,084 | * 11/1999 | Watts | 713/323 |

* cited by examiner

Primary Examiner—Ario Etienne
(74) Attorney, Agent, or Firm—Trop, Pruner & Hu, P.C.

(57) ABSTRACT

A method to manage power consumption in a computer system includes receiving a power signal from a power source (the power signal furnishing power to a portion of the circuit), generating a first signal indicating the power transferred from the power source to the portion of the computer system, and generating a second signal to effect a power management action based on the first signal. By way of example, the power source may be a switching or linear power supply, and the second signal may be a fan control signal, a processor halt signal, or a processor interrupt signal.

13 Claims, 4 Drawing Sheets

POWER AND THERMAL MANAGEMENT BASED ON A POWER SUPPLY OUTPUT

RELATED APPLICATIONS

This application is related to U.S. patent application entitled "Power Management Apparatus" (attorney docket number MICE-0006-00-US), filed contemporaneously.

BACKGROUND

The invention relates generally to power management in electronic circuits and more particularly, to power management based on a direct measure of a circuit's power consumption.

Power management techniques in, for example, a computer system typically employ thermal sensors and/or inactivity timers. Thermal sensors provide an indirect mechanism to monitor and control a circuit's power consumption by measuring the heat generated by one or more components within the circuit. System response to an over temperature condition is generally to reduce the operating speed of the computer system's central processing unit (CPU). This may be accomplished by asserting a stop clock signal (an input signal to many modern CPU devices) for some period of time, typically in a pulse width modulation (PWM) fashion, or by actually reducing the system clock frequency.

Many modern computer systems use only a limited number of thermal sensors. Most personal computer systems use only a single thermal sensor located near the CPU. Since the CPU is a large heat source, and one whose power consumption is highly subject to the computational task involved, this approach has been prudent. Still, thermal sensors have a number of limitations which make their use sub-optimal. One limitation is that thermal sensors are generally physically separated from the circuits they monitor. (This is true even if the thermal sensor is part of the CPU die.) Thus, the temperature indicated by a thermal sensor is only a rough estimate of the temperature of a device. Another limitation is that thermal sensors rely on the transfer of thermal energy from the circuits generating heat. This takes time. Thus, the current temperature indicated by a thermal sensor most accurately reflects the temperature of a device at some prior time. Yet another limitation is that thermal sensors located near a CPU are dominated by CPU thermal events. Thus, even though other system components may generate a significant amount of heat (representing a significant amount of power consumption), this generally goes undetected.

Inactivity timers, on the other hand, are generally used to power down input-output (I/O) ports and peripheral devices when they have not been used for a specified amount of time. As such, inactivity timers generally do not protect devices from an over temperature condition when they are being used.

Thus, it would be beneficial to provide a mechanism to protect electronic circuits from an over temperature condition based on a direct measure of a circuit's power consumption.

SUMMARY

In one embodiment, the invention provides a method to manage power in a computer system. The method includes receiving a power signal from a power source (the power signal furnishing power to a portion of the computer system), generating a first signal indicating the power transferred from the power source to the portion of the computer system, and generating a second signal to effect a power management action based on the first signal.

DETAILED DESCRIPTION

Techniques (including methods and devices) to manage power consumption of a circuit based on a direct measure of the power consumed by the circuit are described. The following embodiments of this inventive concept, described in terms of a personal computer system, are illustrative only and are not to be considered limiting in any respect.

Figure 1:
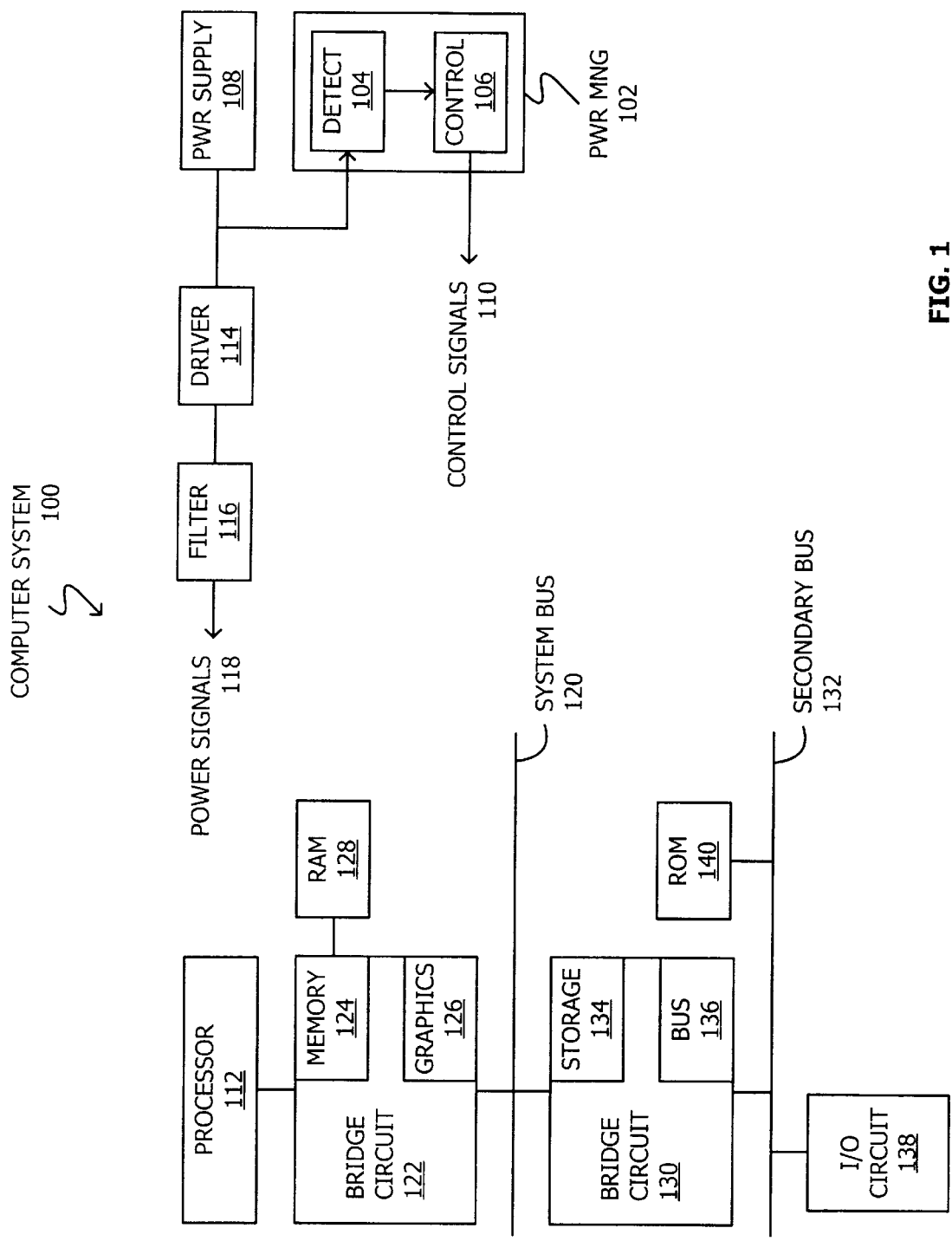
FIG. 1 shows a computer system in accordance with one embodiment of the invention.

Referring to FIG. 1, computer system 100 having power management circuit 102 in accordance with one embodiment of the invention is illustrated. As shown, power management circuit 102 may include detection circuit 104 and control circuit 106. Detection circuit 104 determines the actual power consumption of computer system 100 from power supply 108. Based on the detected power consumption, control circuit 106 may generate control signals 110 to modify the operation of computer system 100. For example, if power management circuit 102 determines that the measured power consumption warrants additional cooling, control signals 110 may selectively enable cooling fans (not shown), reduce the operating frequency of a system clock (not shown), temporarily halt processor 112, or power computer system 100 down. Conversely, if power management circuit 102 determines that the measured power consumption warrants less cooling, control signals 110 may selectively disable fans, increase the operating frequency of the system clock, or release processor 112 from a halted state.

In one embodiment, power supply 108 may be a linear power supply. In another embodiment, power supply 108 may be a switching power supply. In yet another embodiment, power supply 108 may include a primary power supply (linear or switching) and one or more slave regulators. Regardless of its configuration, power supply 108 generates one or more output signals generally indicating the power supplied to computer system 100 including, perhaps, peripherals. As indicated, output from power supply 108 is typically processed by driver circuit 114 (e.g., high-current field effect transistors) and low pass filter 116 before being supplied to components of computer system 100 in the form of one or more power signals 118. For example, power signals 118 may be voltage or current signals that directly supply power. Generally, power signals 118 may be one or more PWM signals.

In addition to power management circuit 102 and power supply 108, computer system 100 may include processor 112 coupled to system bus 120 through bridge circuit 122. Processor 112 may be one or more general or special purpose processors or a custom designed state machine.

Bridge circuit 122 may also provide memory and graphics port interfaces 124 and 126 respectively. Random access memory (RAM) 128 may be coupled to computer system 100 via memory interface 124. An illustrative system bus 120 conforms to the Peripheral Component Interconnect (PCI) bus specification.

In addition, bridge circuit 130 may couple system bus 120 to secondary bus 132, while also providing storage and bus interfaces 134 and 136 respectively. Illustrative secondary buses include buses that conform to the PCI, Low Pin Count (LPC), Industry Standard Interface (ISA), and Extended Industry Standard Interface (EISA) specifications. Common storage devices include magnetic and optical disk drives. A common bus interface conforms with the Universal Serial Bus (USB) standard. Input-output (I/O) circuit 138 and system read only memory (ROM) 140 may also be coupled to secondary bus 132. Input-output circuit 138 may provide peripheral interfaces such as parallel and serial ports, floppy disk ports, and infrared ports.

Figure 2:
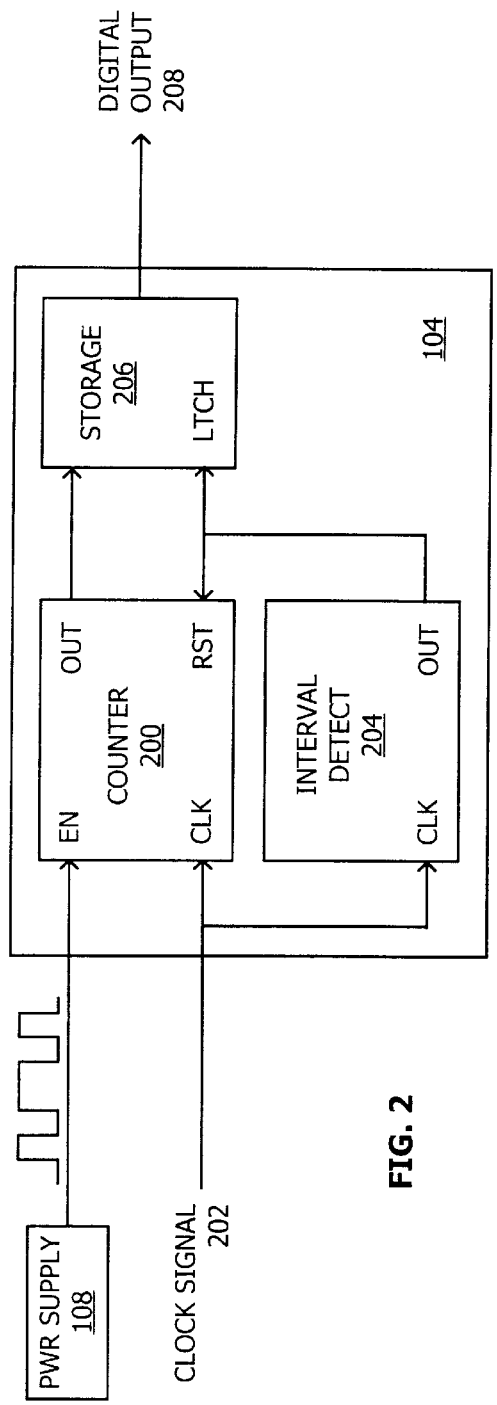
FIG. 2 shows a block diagram of a power detection circuit that generates a digital output signal in accordance with one embodiment of the invention.

In one embodiment, where power supply 108 is a switching power supply and thus power signal output is a pulse width modulated (PWM) signal, detection circuit 104 may generate a digital representation of the PWM signal's duty cycle to provide a direct indication of the power being consumed by computer system 100. Referring to FIG. 2, a PWM power signal drives the enable input (EN) of counter 200. Clock signal 202 drives the clock input (CLK) of both counter 200 and interval detection circuit 204. Interval detection circuit 204 may periodically (and temporarily) assert its output signal (OUT) to cause counter 200 output to be stored into storage device 206 (via the LTCH input) and to reset counter 200 (via the RST signal). For example, interval detection circuit 204 output may be a short duration pulse. Alternatively, interval detection circuit 204 output may be two pulses: the first pulse causing counter 200 output to be loaded into storage device 206; the second pulse (occurring substantially immediately following the first pulse) causing counter 200 to reset. In this configuration, digital output 208 provides an indication of the duty cycle of power supply 108's PWM output signal.

Figure 3:
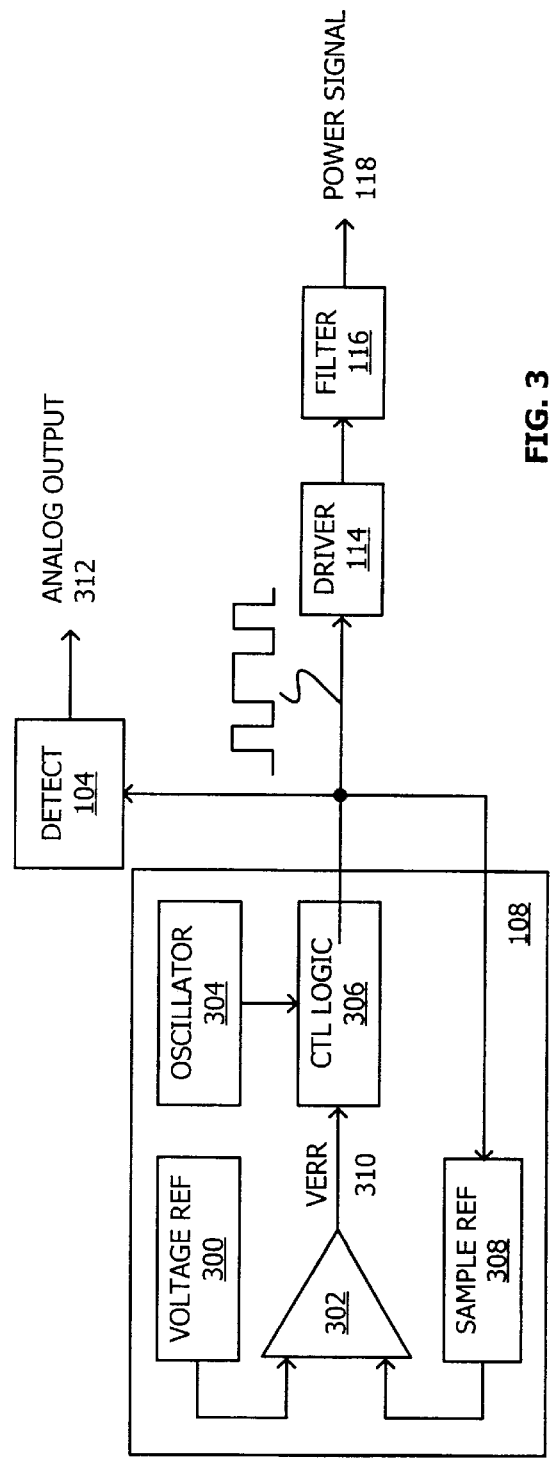
FIG. 3 shows a block diagram of a power detection circuit that generates an analog output signal in accordance with one embodiment of the invention.

In another embodiment, detection circuit 104 may generate an analog representation of the duty cycle of power supply 108's PWM output signal. As shown in FIG. 3, a typical switching power supply (e.g., power supply 108) includes voltage reference source 300, error signal amplifier 302, oscillator 304, control logic 306 (e.g., a transistor), and sampling network 308. In general, switching power supply 108 couples a sampled version (via sampling network 308) of its output to differential amplifier 302. Differential amplifier 302 compares a portion of this signal to a reference voltage (supplied by voltage reference source 300) to generate error signal ($V_{ERR}$) 310. Error signal 310 modulates control logic 306 to generate power supply output which, in one embodiment, is processed by driver and filter circuits 114 and 116 respectively. Power supply output may be used by detection circuit 104 to provide an analog indication 312 of the actual power being supplied by power supply 108. For example, in one embodiment detection circuit 104 may be a resistor-capacitor (RC) circuit. In another embodiment, detection circuit 104 may be an operational amplifier configured as an integrator.

Figure 4:
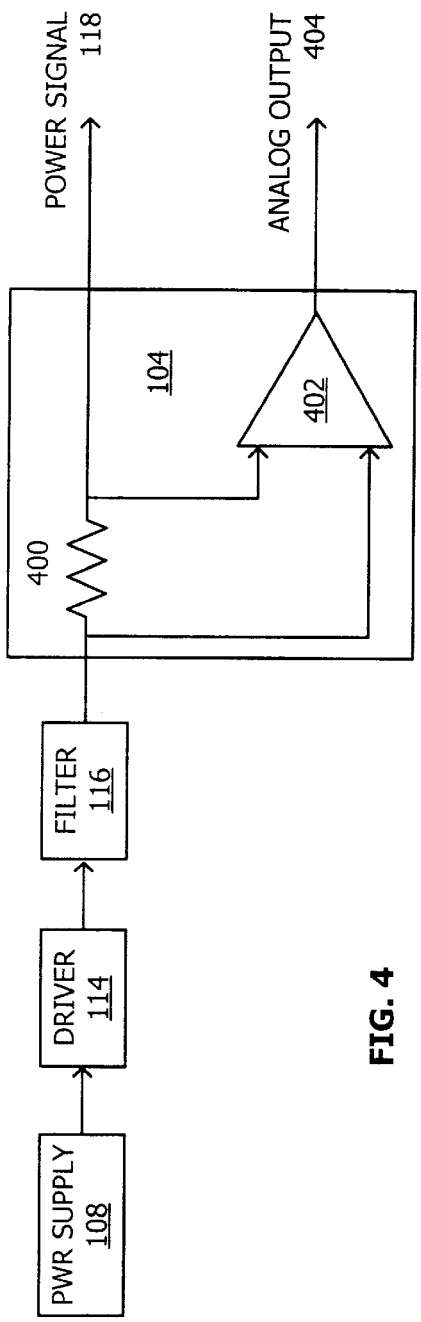
FIG. 4 shows a block diagram of a power detection circuit that generates an analog output signal in accordance with another embodiment of the invention.

In yet another embodiment, detection circuit 104 may generate an analog representation of the duty cycle of power supply 108's PWM output signal by generating a current signal proportional to the power being provided by power supply 108. Referring to FIG. 4, for example, resistor 400 may be coupled in series with output from filter 116 to generate a voltage drop. The voltage drop, in turn, may be detected and, possibly, amplified by amplifier 402 to generate detection circuit output (analog output signal 404.).

Figure 5:
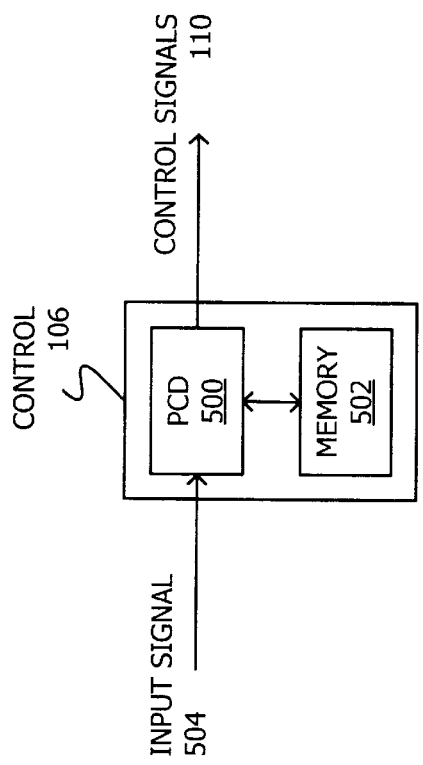
FIG. 5 shows a block diagram of a control circuit in accordance with one embodiment of the invention.

Referring to FIG. 5, control circuit 106 configured to accept a digital signal indicating a power signal's duty cycle may include programmable control device (PCD) 500 and memory 502. An illustrative programmable control device 500 may be a general purpose microprocessor, a microcontroller, or a custom designed state machine embodied in, for example, a printed circuit board comprising discrete logic, integrated circuits, specially designed application specific integrated circuits (ASICs), or programmable gate array devices.

In one embodiment, PCD 500 may be programmed to generate control signals 110 based on the amount of power being consumed as indicated by input signal 504. For example, if input signal 504 indicates X amount of power is being consumed, PCD 500 may selectively enable one or more cooling fans via control signals 110. If input signal 504 indicates X+Y amount of power is being consumed, PCD 500 may, in addition to or in lieu of enabling cooling fans, selectively reduce the clock frequency provided processor 112 by a specified amount (this amount may vary as the value of Y changes, for example). If input signal 504 indicates X+Y+Z amount of power is being consumed, PCD 500 may generate a stop clock signal to processor 112 or even initiate powering down of computer system 100. The number of levels (e.g., X, Y, and Z) and the precise value associated with each value is a matter of design choice and may vary from system to system.

In another embodiment, PCD 500 may determine the rate of change of power consumption (as indicated by power consumption signal 504). This determination may be used to select a power management option, e.g., enable or disable cooling fans, reduce or increase the clock frequency provided processor 112, or powering off peripheral devices.

In yet another embodiment, PCD 500 may be adapted to generate interrupt control signals to processor 112. For example, if the interface between the computer system's operating system, hardware and basic input-output system (BIOS) software is defined by the advanced configuration and power interface (ACPI) specification, the PCD may generate a system control interrupt (SCI) to notify the operating system of a power management event. If, on the other hand, the interface between the computer system's BIOS and hardware is defined by the advanced power management (APM) specification, the PCD may generate a system management interrupt (SMI) to notify the operating system of a power management event.

Memory 502 may be used to store instructions to implement the above described control options and may also include data which may determine values for, for example, X, Y, and Z. Memory 502 may include nonvolatile memory such as EPROM, EEPROM, and flash devices. Further, memory 502 may be incorporated within PCD 500.

Figure 6:
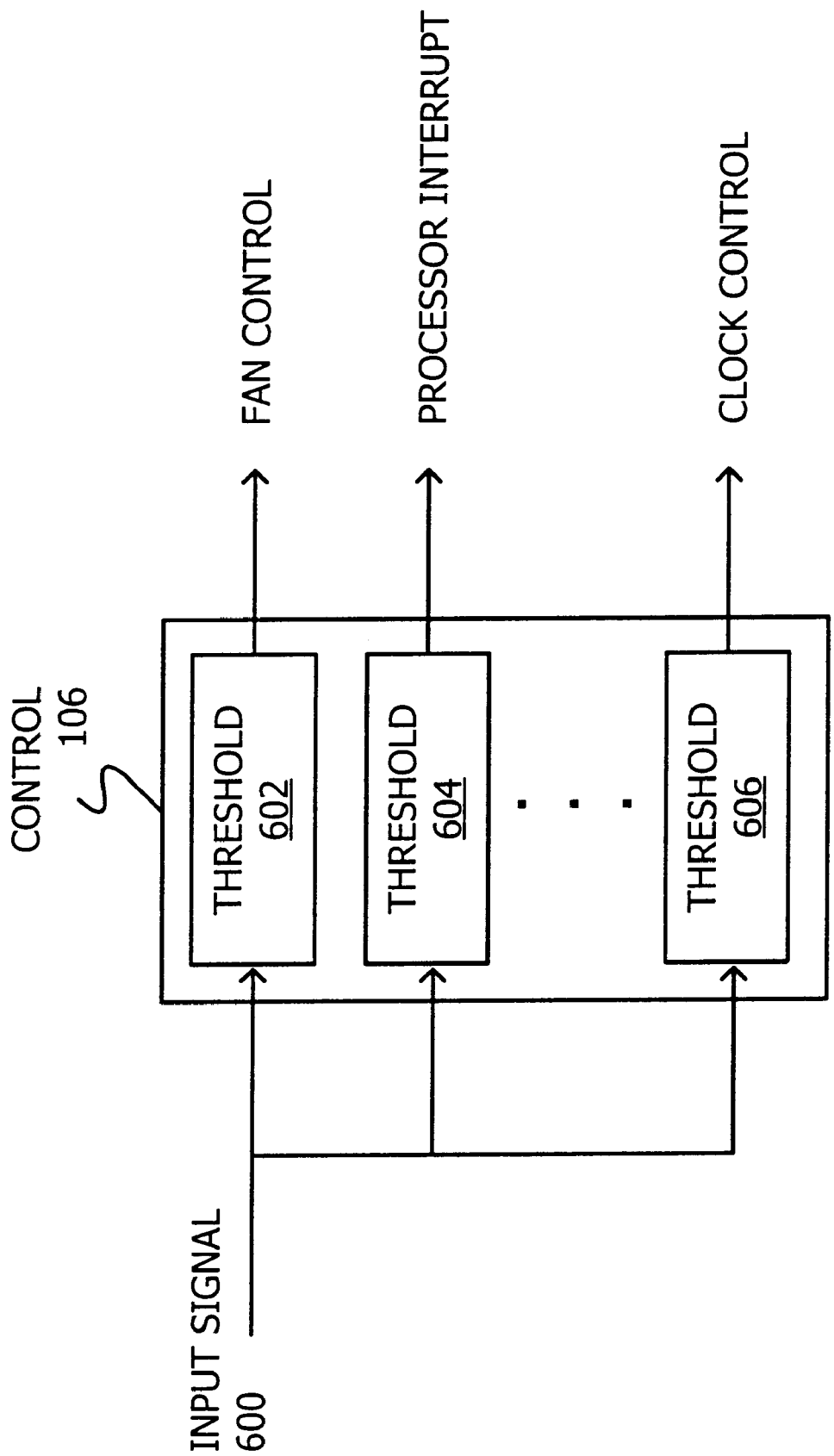
FIG. 6 shows a block diagram of a control circuit in accordance with another embodiment of the invention.

Referring now to FIG. 6, control circuit 106 may also be configured to accept an analog signal indicating the duty cycle of power supply 108's output signal (e.g., analog output signal 312 and 404). In one embodiment, input signal 600 may be supplied to one or more threshold detection circuits 602, 604, and 606. Each threshold detection circuit may have a first threshold that, when exceeded, produces a control signal to perform a specific action. For example, a first threshold may: enable a cooling fan via circuit 602; generate a processor interrupt signal via circuit 604; or cause a reduction in the system clock's operating frequency via circuit 606. Each threshold detection circuit 602, 604, and 606 may also have a second threshold (the same or different from the first threshold) to retract the operation indicated when the first threshold was exceeded.

One benefit of using a direct measure of a circuit's actual power consumption is that power management options (e.g., actions to increase cooling) may be made before circuit components reach a critical temperature. Another benefit in accordance with the invention is that changes in circuit power consumption may be detected and modified far more rapidly than prior techniques relying on thermal measures. Yet another benefit in accordance with the invention is that power consumption may be monitored and managed regardless of the ambient temperature.

Various changes in the materials, components, and circuit elements are possible without departing from the scope of the claims. For instance, a circuit may include multiple power supplies and/or multiple regulators. Power management in accordance with the invention may be applied to any one or combination of such supplies. For example, some computer systems employ a dedicated regulator for the processor—this regulator may be independently monitored and power management options determined in accordance with the invention without the need to incorporate the same capability in all of the system's supplies and/or regulators. In addition, a signal indicative of a circuit's actual power consumption may be provided to a conventional power management device. For example, a conventional power management device may be coupled to computer system 100 by way of an inter-integrated circuit ($I^2C$) control bus sponsored by Phillips Electronic) or a system management bus (SMB) sponsored by Intel Corporation. Such a device may be adapted to accept a measure of a circuit's actual power consumption. Techniques in accordance with the invention may also be used in conjunction with power management techniques employing thermal sensors. For example, a thermal sensor may be used as a fail-safe mechanism to ensure that power management thresholds are not exceeded even when operating in an extreme environment.

While the invention has been disclosed with respect to a limited number of embodiments, numerous modifications and variations will be appreciated by those skilled in the art. It is intended, therefore, that the following claims cover all such modifications and variations that may fall within the true sprit and scope of the invention.

What is claimed is:

1. A method of thermal management in a computer system, comprising:

receiving a power signal from a power source, the power signal indicating an amount of power furnished to a portion of the computer system;

generating a first signal based on the power signal indicating a thermal condition of the computer system portion; and generating a second signal to effect a power management action based on the first signal.

2. The method of claim 1, wherein the act of receiving a power signal from a power source comprises receiving a power signal from a switching power supply.

3. The method of claim 2, wherein the act of generating a first signal comprises generating a signal indicating a duty cycle of the power signal.

4. The method of claim 1, wherein the act of generating a second signal comprises generating a fan control signal.

5. The method of claim 1, wherein the act of generating a second signal comprises generating an interrupt signal.

6. The method of claim 1, wherein the act of generating a second signal comprises generating a processor halt signal.

7. The method of claim 6, wherein the act of generating a processor halt signal comprises generating a stop-clock signal.

8. A method of thermal management in a system, comprising:

monitoring an output of a power supply to determine usage of power;

determining if power usage exceeds one or more predetermined levels; and activating one or more cooling devices if power usage exceeds at least one of the one or more predetermined levels.

9. A method, comprising:

receiving a power signal from a power source, wherein the power signal is a pulse width modulated signal, the pulse width modulated signal indicating an amount of power furnished to a portion of a computer system;

generating a representation of a duty cycle of the pulse width modulated signal; and generating a second signal to effect a power management action based on a state of the representation.

10. The method of claim 9, wherein generating the representation includes generating a digital representation.

11. The method of claim 9, wherein generating the representation includes generating an analog signal.

12. The method of claim 11, wherein generating the second signal is performed when the analog signal exceeds a first threshold value.

13. The method of claim 12, further comprising generating a third signal to effect a second power management action based on the analog signal exceeding a second threshold value.

* * * * *